United States Patent
Nishitani et al.

(10) Patent No.: US 7,975,741 B2
(45) Date of Patent: Jul. 12, 2011

(54) PNEUMATIC TIRE AND PRODUCING METHOD OF PNEUMATIC TIRE

(75) Inventors: Kazuma Nishitani, Osaka (JP); Shigeru Ohno, Osaka (JP); Hiroshi Ikegami, Osaka (JP); Koji Hiramatsu, Osaka (JP); Katsuhiro Nakatani, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1000 days.

(21) Appl. No.: 11/379,746

(22) Filed: Apr. 21, 2006

(65) Prior Publication Data

US 2006/0237112 A1 Oct. 26, 2006

(30) Foreign Application Priority Data

Apr. 22, 2005 (JP) ................. 2005-124980

(51) Int. Cl.
*B60C 13/00* (2006.01)
*B29D 30/72* (2006.01)

(52) U.S. Cl. .............. 152/524; 156/117; 156/130.7; 156/132

(58) Field of Classification Search .......... 156/116, 156/117, 123, 130, 130.7; 152/524, 525, 152/454

See application file for complete search history.

(56) References Cited

U.S. PATENT DOCUMENTS

| | | | | |
|---|---|---|---|---|
| 3,268,380 A | * | 8/1966 | Guichon et al. | 156/130 |
| 3,523,854 A | * | 8/1970 | Cantarutti | 156/397 |
| 3,814,161 A | * | 6/1974 | Powell et al. | 152/454 |
| 4,112,994 A | * | 9/1978 | Mills et al. | 152/209.11 |
| 5,016,697 A | * | 5/1991 | Noma et al. | 152/454 |
| 5,145,536 A | * | 9/1992 | Noma et al. | 152/209.16 |
| 5,427,164 A | * | 6/1995 | Williams et al. | 152/209.1 |
| 6,318,429 B1 | * | 11/2001 | Corner et al. | 152/454 |
| 6,554,041 B1 | | 4/2003 | Ohki et al. | |
| 7,060,146 B2 | | 6/2006 | Ikeda et al. | |
| 2005/0145314 A1 | | 7/2005 | Ikeda et al. | |
| 2005/0173041 A1 | * | 8/2005 | Miki | 152/525 |
| 2006/0118227 A1 | | 6/2006 | Miki | |

FOREIGN PATENT DOCUMENTS

| | | |
|---|---|---|
| JP | 1990-167732 | 6/1990 |
| JP | 6-254990 | 9/1994 |
| JP | 9-254274 | 9/1997 |
| JP | 2000-246812 | 9/2000 |
| JP | 2002-127718 | 5/2002 |
| JP | 2002-200677 A | 7/2002 |
| JP | 2002-205512 | 7/2002 |
| JP | 2002-370292 | 12/2002 |
| JP | 2004-50985 | 2/2004 |

(Continued)

OTHER PUBLICATIONS

Machine translation of JP 9-254274, Sep. 30, 1997.*

(Continued)

*Primary Examiner* — Geoffrey L Knable
(74) *Attorney, Agent, or Firm* — Knobbe, Martens, Olson & Bear, LLP (57) ABSTRACT

A sidewall rubber disposed outside of a carcass layer, reinforcing a portion between beads, in a widthwise direction of the tire is configured from a wide rubber ribbon having a width of 20 to 100 mm wound spirally along a circumferential direction of the tire outward of the tire such that the rubber ribbon is deviated radially outward of the tire.

8 Claims, 5 Drawing Sheets

FOREIGN PATENT DOCUMENTS

| | | |
|---|---|---|
| JP | 2004-249537 | 9/2004 |
| JP | 2004-268404 | 9/2004 |
| JP | 2006-151327 | 6/2006 |
| JP | 2006-159945 | 6/2006 |
| WO | WO 03/103935 | 12/2003 |

OTHER PUBLICATIONS

Publication Filing Form submitted in the corresponding Japanese Patent Application No. 2005-124980, filed on Sep. 8, 2008.

Japanese Office Action Mar. 23, 2011 for Japanese Counterpart Patent Application No. 2005-124980.

* cited by examiner

PNEUMATIC TIRE AND PRODUCING METHOD OF PNEUMATIC TIRE

BACKGROUND OF THE INVENTION

1. Field of the Invention

The present invention relates to a pneumatic tire which can suppress cracks caused by a ribbon interface of a sidewall outer peripheral wall, and which does not deteriorate the productivity, and to a producing method of such a pneumatic tire.

2. Description of the Related Art

An example of common producing methods of a pneumatic tire is as follows. First, a cylindrical forming drum is prepared, and an inner linear rubber member and a carcass ply having predetermined width are disposed cylindrically on outer peripheries thereof. Then, annular beads are fitted over both sides of the carcass ply in its widthwise direction, the end of the carcass ply in the widthwise direction is wound back outside and then, a sidewall rubber member is disposed on the side of the outer periphery of the wound back ply, thereby forming a first case. Next, the first case is disposed on the side of an inner periphery of a cylindrical second case formed, in a different step, from a belt member and a tread rubber member, a central portion is swelled and deformed while approaching a pair of beads, thereby crimping an outer peripheral surface of the first case onto an inner peripheral surface of the second case, thereby forming a green tire. Such a producing method is disclosed in Japanese Patent Application Laid-open No. H06-254990.

Figure 5:
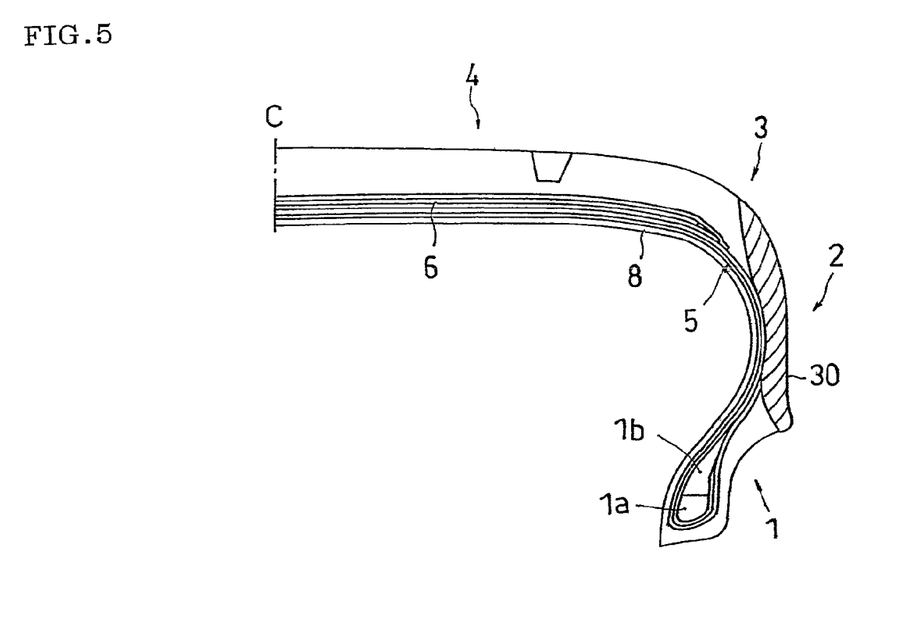
FIG. 5 is a sectional view, taken along a tire meridian, illustrating a half of a pneumatic tire of a conventional pneumatic tire.

Conventionally, there is a known ribbon winding method as a method for forming a rubber member. According to the ribbon winding method, a narrow rubber ribbon made of unvulcanized rubber composition is wound along the circumferential direction of the tire to form a rubber member of a predetermined cross section shape. With this method, it is possible to precisely and easily form a sidewall rubber 30 for a pneumatic tire as shown in FIG. 5. Japanese Patent Application Laid-open No. 2002-200677 discloses a method for forming a sidewall rubber by winding a narrow rubber ribbon around an outer side of a carcass ply deformed toroidally to form the sidewall rubber.

However, when the sidewall rubber is formed by the ribbon winding method, a difference in level is caused in a sidewall outer peripheral wall along a ribbon interface of thereof, and there is a problem that a crack is generated due to this. Especially when the height of tire cross section was 110 mm or less, it was found that a large distortion was applied to a region of maximum width position from a shoulder portion when a load rolls at the time of running, and a crack was prone to be generated.

To cope with this problem, it is conceived that the difference in level on a sidewall outer peripheral wall is reduced by using a narrower rubber ribbon. However, according to this method, since the number of windings of the rubber ribbon is largely increased, the forming time is increased and the productivity is deteriorated. In Japanese Patent Application Laid-open No. 2004-50985, there is proposed a pneumatic tire in which a sidewall outer peripheral wall in a region where a crack is prone to be generated is coated with a rubber sheet. In this case, there are a problem that peeling off is generated due to air accumulated between the rubber sheet and the outer peripheral wall, and a problem that the productivity is deteriorated because of the paste of the rubber sheet.

SUMMARY OF THE INVENTION

The present invention has been accomplished in view of the above circumstances, and it is an object of the invention to provide a pneumatic tire which can suppress cracks due to a ribbon interface of a sidewall outer peripheral wall, and which does not deteriorate the productivity, and to provide a producing method of the pneumatic tire.

The object can be achieved by the present invention having the following structure. The present invention provides a pneumatic tire including: a carcass layer for reinforcing a portion between a pair of annual beads; and a sidewall rubber which is disposed on an outside of the carcass layer in a widthwise direction of the tire and in which a rubber ribbon is spirally wound along a circumferential direction of the tire, wherein the rubber ribbon is a wide rubber ribbon having a width of 20 to 100 mm, and wound outward of the tire such that the rubber ribbon is deviated radially outward of the tire.

According to this structure, the wide rubber ribbon having the width of 20 to 100 mm is disposed in a region of the sidewall outer peripheral wall where a crack is prone to be generated. Thus, the ribbon interface is reduced in such a region, and it is possible to effectively prevent cracks from being generated. The number of windings of the rubber ribbon is reduced by using the wide rubber ribbon, the forming time is shortened and the productivity is enhanced.

In the above structure, it is preferable that a height of a tire cross section is not more than 110 mm, and an inner end of the wide rubber ribbon disposed on the outermost side in the radial direction of the tire is located on an inner side from the tire maximum width position in the radial direction of the tire.

With this structure, an outer end of the wide rubber ribbon disposed on the outermost side in the radial direction of the tire is disposed on the shoulder portion, an inner end thereof in the radial direction of the tire is located on inner side than the tire maximum width position in the radial direction of the tire. Therefore, in a pneumatic tire whose tire cross section height is not more than 110 mm, it is possible to more reliably suppress the cracks from being generated without allowing the ribbon interface to exist on the sidewall outer peripheral wall of a region where cracks are easily generated.

Further, the present invention provides a producing method of a pneumatic tire including: a ply disposing step for cylindrically disposing a carcass ply on an outer peripheral side of a forming drum; and a winding back step for fitting an annular bead over the carcass ply to outwardly wind an end of the carcass ply in the widthwise direction through the bead, wherein the producing method further includes a side forming step in which a wide rubber ribbon having a width of 20 to 100 mm is spirally wound around an outer periphery of a forming drum before the ply disposing step along a circumferential direction toward inside from outside in a widthwise direction of the drum, and a sidewall rubber member is formed at a location where an end of the carcass ply in the widthwise direction is disposed, and wherein in the winding back step, the end of the carcass ply in the widthwise direction is wound back together with the sidewall rubber member.

With this configuration, the wide rubber ribbon having the width of 20 to 100 mm is disposed in the region of the sidewall outer peripheral wall where cracks are prone to be generated. Thus, in such a region, the ribbon interface is reduced, and the generation of cracks can effectively be suppressed. The number of windings of the rubber ribbon is reduced by using the wide rubber ribbon, the forming time is shortened and the productivity is enhanced. In the conventional technique, since the rubber ribbon is narrow in width and high in temperature, the rigidity of the sidewall rubber member is low and the winding end is curled, and it is difficult, in practical use, to wind back the rubber ribbon together with the carcass ply. Whereas, according to the present invention, since the wide rubber ribbon is wound in a superposed manner, rigidity that is sufficient to wind the rubber ribbon together with the carcass ply is secured. Further, in forming the sidewall rubber, if the wide rubber ribbon is wound around an outer periphery of the wound back ply on the forming drum or wound around an outer side of the toroidally deformed carcass ply, there is a tendency that air is accumulated therebetween, but according to the above configuration, since the wide rubber ribbon can be wound around the outer periphery of the forming drum, such a problem does not occur.

In the above method, it is preferable that a height of a tire cross section of the pneumatic tire is not more than 110 mm, and an inner end of the wide rubber ribbon disposed on the outermost side in the radial direction of the tire is located on an inner side from the tire maximum width position in the radial direction of the tire after the winding back step.

With this structure, an outer end of the wide rubber ribbon disposed on the outermost side in the radial direction of the tire is disposed on the shoulder portion, an inner end thereof in the radial direction of the tire is located on inner side than the tire maximum width position in the radial direction of the tire. Therefore, in a pneumatic tire whose tire cross section height is not more than 110 mm, it is possible to more reliably suppress the cracks from being generated without allowing the ribbon interface to exist on the sidewall outer peripheral wall of a region where cracks are easily generated.

In the above method, it is preferable that in the side forming step, the number of windings of the wide rubber ribbon is not more than four times, a relationship between a widthwise direction feeding amount S (mm) of the wide rubber ribbon and a thickness T (mm) of the wide rubber ribbon satisfies one of:

(a) $0 < S < 2.0$, and $T \geq 0.8$,
(b) $2.0 \leq S < 4.0$, and $T \geq 1.0$,
(c) $4.0 \leq S < 6.0$, and $T \geq 1.2$, and
(d) $6.0 \leq S \leq 8.0$, and $T \geq 1.5$.

According to the present invention, the wide rubber ribbon having the width of 20 to 100 mm is used as a rubber ribbon. With this, if the rubber ribbon is wound four times or less, the sidewall rubber member can be formed and with this, the ribbon interface can largely be reduced and the productivity can be enhanced. At that time, if a thickness T of a constant value or more is secured in accordance with the widthwise direction feeding amount S of the wide rubber ribbon, it is possible to secure the rigidity of the sidewall rubber member and to easily wind the sidewall rubber member together with the carcass ply.

The present invention also provide a producing method of a pneumatic tire including: a ply disposing step for cylindrically disposing a carcass ply on an outer peripheral side of a forming drum; and a winding back step for fitting an annular bead over the carcass ply to outwardly wind an end of the carcass ply in the widthwise direction through the bead, wherein the producing method further includes a step in which a rubber extrudate immediately after it is integrally extruded is once annularly wound around a portion where an end of the carcass ply in a widthwise direction is disposed on an outer peripheral side of a forming drum before the ply disposing step to form a sidewall rubber member, and wherein in the winding back step, the end of the carcass ply in the widthwise direction is wound back together with the sidewall rubber member.

According to this configuration, the rubber extrudate which is integrally extruded is disposed in the region of the sidewall outer peripheral wall where cracks are prone to be generated. Thus, no ribbon interface is formed in such a region, and it is possible to effectively prevent cracks from being generated, and the forming time is shortened and the productivity is enhanced. When a rubber extrudate obtained by the extrusion is once wound up as an intermediate member, the shape thereof is deformed at the time of winding up operation and size precision is deteriorated, a joint portion is widened by tension at the time of winding up operation, and balance is deteriorated in some cases. According to the present invention, however, since the ribbon interface which is in the high temperature state immediately after the extrusion is used, such a problem is not caused and the number of parts can be reduced.

DESCRIPTION OF THE PREFERRED EMBODIMENTS

An embodiment of the present invention will be explained with reference to the drawings.

[Structure of Pneumatic Tire]

Figure 1:
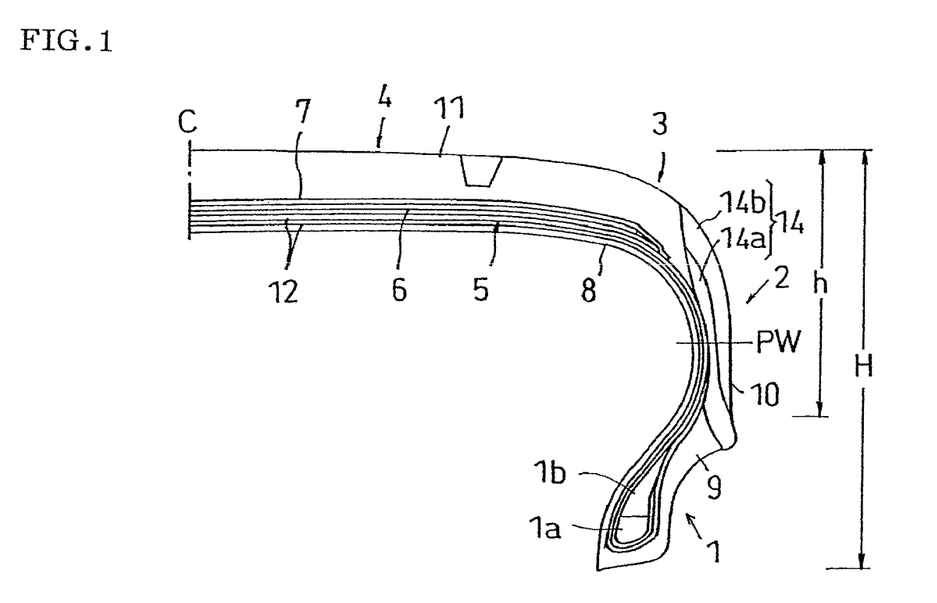
FIG. 1 is a sectional view, taken along a tire meridian, illustrating a half of a pneumatic tire of the present invention.

FIG. 1 is a sectional view, taken along a tire meridian, illustrating a half of a pneumatic tire showing a state after the pneumatic tire of the present invention is vulcanized. This pneumatic tire includes a pair of bead portions 1, sidewall portions 2 extending from respective bead portions 1 radially outward of the tire, and tread portions 4 connected to the respective sidewall portions 2 radially outward of the tire through a shoulder portion 3. In the bead portion 1, an annular bead 1a formed by converged body of bead wires, and a bead filler 1b disposed outside of the bead 1a in the circumferential direction of the tire. A sidewall rubber 10 is disposed on a sidewall portion 2 on the outer side of the tire, and a tread rubber 11 is disposed on a tread portion 4 on the outer side of the tire.

A carcass layer 5 includes at least one carcass ply in which cords such as polyester cords are arranged in parallel to each other at an angle of about 90° with respect to a tire equator C. In this embodiment, two carcass plies 12 extends between a pair of bead portions 1. The cords constituting the carcass ply 12 are not limited to the polyester cords, and organic fibers such as rayon, nylon and aramid, and steel can also be used suitably.

A belt layer 6 for reinforcing the tire using loop effect is disposed on the tread portion 4 of the carcass layer 5 on the outer side of the tire. The belt layer 6 includes at least one belt ply, and in this embodiment, two belt plies in which steel cords incline with respect to the tire equator C through about 20° are laminated such that their inclining directions are opposite from each other. A reinforcing layer 7 is disposed on the belt layer 6 on the outer side of the tire. An inner liner rubber 8 for maintaining the internal pressure of the tire is disposed on the carcass layer 5 on the inner side of the tire.

The above structure of this tire is the same as that of a common pneumatic tire, and the present invention can be applied to any tire having a sidewall rubber disposed on the carcass layer on the outer side of the tire in its widthwise direction.

The sidewall rubber 10 is formed by spirally winding a rubber ribbon made of band-like unvulcanized rubber composition along the circumferential direction of the tire. The rubber ribbon used in the invention is the wide rubber ribbon 14 having a width of 20 to 100 mm. The wide rubber ribbon 14 is wound outward of the tire such that the rubber ribbon is deviated radially outward of the tire. In this embodiment, the rubber ribbon 14 is wound twice, and the wide rubber ribbons 14a and 14b are laminated on the inner and outer sides of the tire at a meridian cross section of the tire.

As described above, the wide rubber ribbon 14 has the width of 20 to 100 mm, but the width is preferably not less than 3, and 40 mm or more is more preferably. With this, it is possible to effectively reduce the ribbon interface of a sidewall outer peripheral wall where cracks are easily generated, and to efficiently reduce the number of windings of the wide rubber ribbon.

In the pneumatic tire of the embodiment, the tire cross section height is set to not more than 110 mm, and large distortion is applied to a region of a tire maximum width position PW from a shoulder portion 3 during running. However, since an inner end of the wide rubber ribbon 14b disposed on the outermost side in the radial direction of the tire is located on an inner side than the tire maximum width position PW in the radial direction of the tire, it is possible to more reliably suppress the cracks from being generated without allowing the ribbon interface to exist on the sidewall outer peripheral wall of a region where cracks are easily generated. The tire cross section maximum width position PW means a maximum width position of a tire profile in a cross section of a tire meridian, and a rim protector 9 which swells outward of the tire is not taken into consideration. The present invention is not limited to a tire in which an inner end of a wide rubber ribbon disposed on the outermost side in the radial direction of the tire is located on the inner side than the tire maximum width position PW in the radial direction of the tire, and it is preferable that a cross section height h as measured from the tire equator is 55% or more with respect to the tire cross section height H. With this, it is possible to effectively reduce the ribbon interface in a region where cracks are prone to be generated.

In this embodiment, the sidewall rubber 10 includes the wide rubber ribbon 14 wound along the circumferential direction of the tire twice, but the invention is not limited to this. As will be described later, it is preferable that the wide rubber ribbon is wound four times or more and with this, it is possible to effectively reduce the ribbon interface to suppress the generation of cracks, and to enhance the productivity. The thickness of the wide rubber ribbon 14 is not especially limited, but it is preferable that the sidewall rubber 10 can be formed by winding the rubber ribbon four times or less, and a preferable thickness of the rubber ribbon 14 is 0.8 to 3.0 mm.

[Producing Method of Pneumatic Tire]

Figure 2:
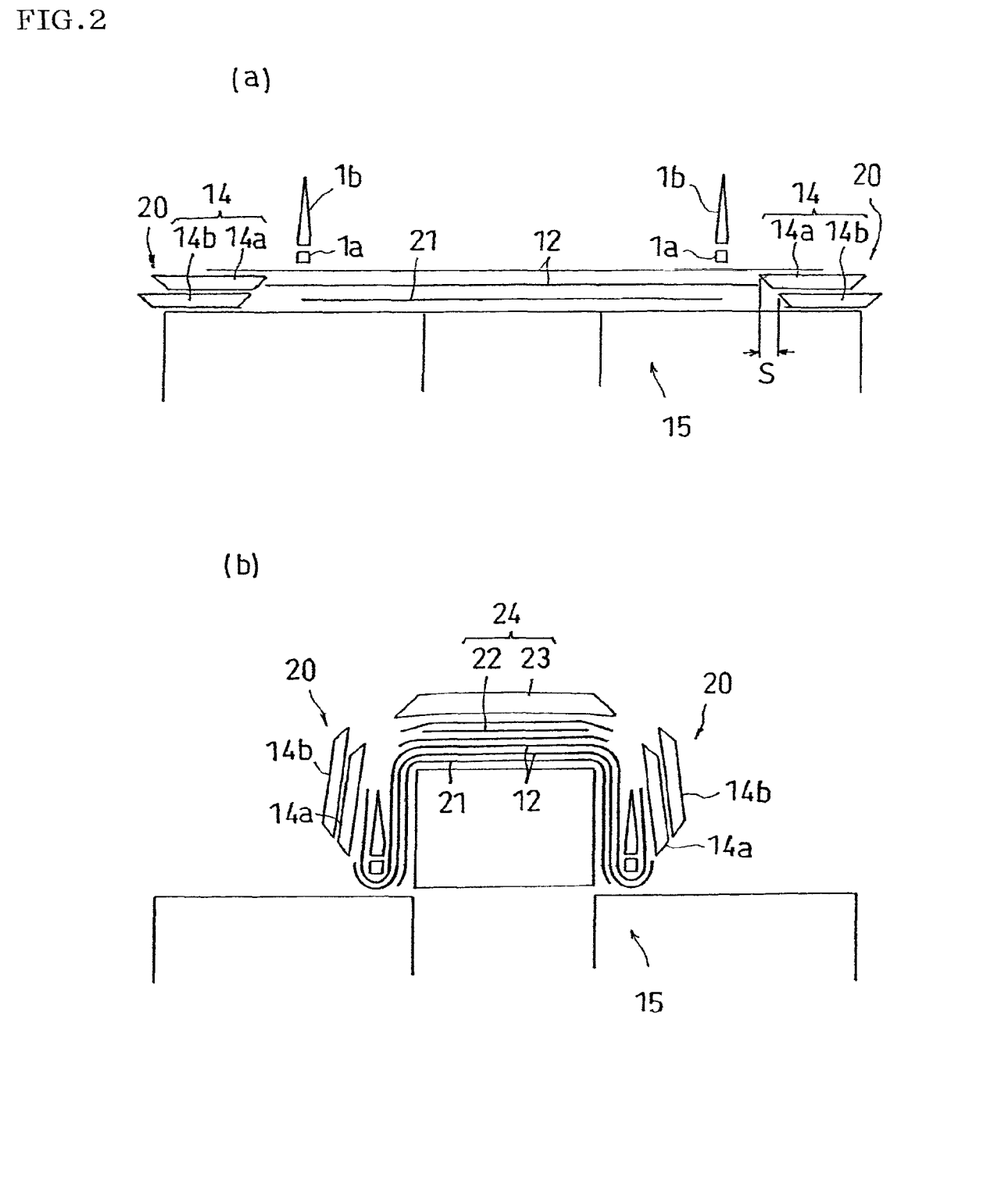
FIG. 2 shows schematic sectional views illustrating a producing method of the pneumatic tire of the present invention.

FIG. 2 shows schematic sectional views of one example of the producing method of the pneumatic tire of the present invention.

First, as shown in FIG. 2(a), the cylindrical forming drum 15 is prepared, and an inner liner rubber member 21 is cylindrically disposed on an outer peripheral surface of the forming drum 15. The sidewall rubbers 20 are cylindrically disposed on both sides of the inner liner rubber member 21 in its widthwise direction where ends of the carcass plies 12 in the widthwise direction are disposed (corresponding to the side forming step). The carcass plies 12 are cylindrically disposed on outer peripheral sides of the inner liner rubber member 21 and the sidewall rubber 20 (corresponding to the ply disposing step), and a bead 1a and a bead filler 1b are fitted over the both sides thereof in the widthwise direction. Although it is not illustrated, a rubber member constituting the rim protector 9 can be disposed on an inner side of the sidewall rubber 20 in the widthwise direction of the drum. With this, the forming procedure can be simplified.

Each of the sidewall rubber members 20 is formed by spirally winding the wide rubber ribbon 14 of 20 to 100 mm width in a superposed manner along the circumferential direction from outside toward inside in the widthwise direction of the drum. The cross section shape of the wide rubber ribbon 14 is not especially limited, and various shapes such as a laterally long rectangular shape and a crescent shape can be employed, but in order to reduce the difference between the members, a trapezoidal shape having an upper side longer than a lower side like the embodiment is preferable.

Figure 3:
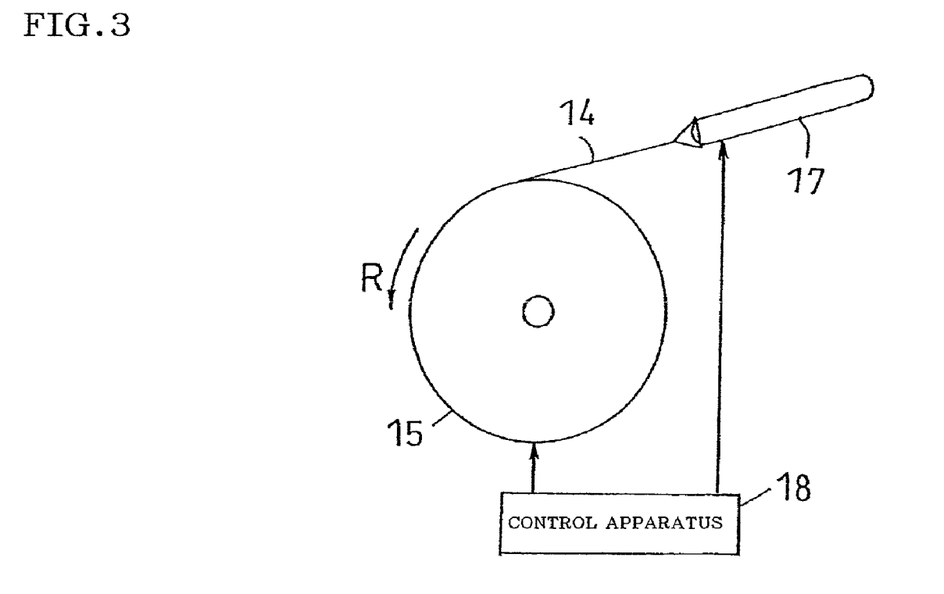
FIG. 3 is a schematic diagram illustrating a structure of an apparatus which winds a rubber ribbon.

The wide rubber ribbon 14 can be wound around the forming drum 15 using an apparatus as shown in FIG. 3 for example. That is, a winding-starting end of the wide rubber ribbon 14 supplied by the rubber ribbon supply apparatus 17 is fixed to an outer peripheral surface of the forming drum 15 and then, the forming drum 15 is rotated in the direction of R and in this state, the rubber ribbon supply apparatus 17 is moved in an axial direction of the drum by a moving mechanism (not shown). The rotation of the forming drum 15 and the movement of the rubber ribbon supply apparatus 17 are controlled by the control apparatus 18, and a sidewall rubber member 20 having a predetermined size and cross section shape is formed.

Here, it is preferable that the number of windings of the wide rubber ribbon 14 is not more than four times as described above. In such a case, when the sidewall rubber member 20 is to be formed, it is preferable that a relationship between a widthwise direction feeding amount S (mm) of the wide rubber ribbon 14 and a thickness T (mm) of the wide rubber ribbon satisfies any one of the following (a) to (d):

(a) $0 < S < 2.0$, and $T \geq 0.8$,
(b) $2.0 \leq S < 4.0$, and $T \geq 1.0$,
(c) $4.0 \leq S < 6.0$, and $T \geq 1.2$, and
(d) $6.0 \leq S \leq 8.0$, and $T \geq 1.5$.

If a thickness T of constant value or more is secured in accordance with the widthwise direction feeding amount S of the wide rubber ribbon 14, rigidity of the sidewall rubber member 20 is secured in such a degree that the sidewall rubber member 20 can be wound back together with the carcass plies 12. In other words, when the thickness T is smaller than the above numeric value in accordance with the widthwise direction feeding amount S, there is a tendency that the winding back becomes difficult. The thickness T is the most thick portion of the wide rubber ribbon 14. The widthwise direction feeding amount S can appropriately be adjusted by changing the moving speed of the rubber ribbon supply apparatus 17 in the axial direction of the drum.

The width of the wide rubber ribbon 14 is in a range of 20 to 100 mm as described above, the preferable width is more than 30 mm, and more preferably more than 40 mm. With this, in addition to the above-described effect, the rigidity of the sidewall rubber member 20 is reliably secured, and the sidewall rubber member 20 can easily be wound back together with the carcass plies 12.

After the bead 1a and the bead filler 1b are fitted, as shown in FIG. 2(b), a cylindrical second case 24 including a belt member 22 constituting the belt layer 6 or the reinforcing layer 7, and a tread rubber member 23 is disposed on the side of the outer periphery. Next, a pair of beads 1a are allowed to approach and displace and in this state, the central portion of the carcass plies 12 swells and deforms. This procedure can be carried out using a conventional bead lock mechanism, a drum-diameter increasing mechanism, and a rubber bag called bladder. In a state where the outer peripheral surface of the carcass plies 12 is crimped onto an inner peripheral surface of the second case 24 and in this state, the end of the carcass plies 12 in the widthwise direction is wound back outside through the bead 1a. At that time, the sidewall rubber member 20 is also wound back together with the carcass plies 12 (corresponding to the winding back step). The formed green tire is vulcanized in a mold having a cavity of a predetermined shape, and a pneumatic tire having an adjusted shape as shown in FIG. 1 is obtained.

Figure 4:
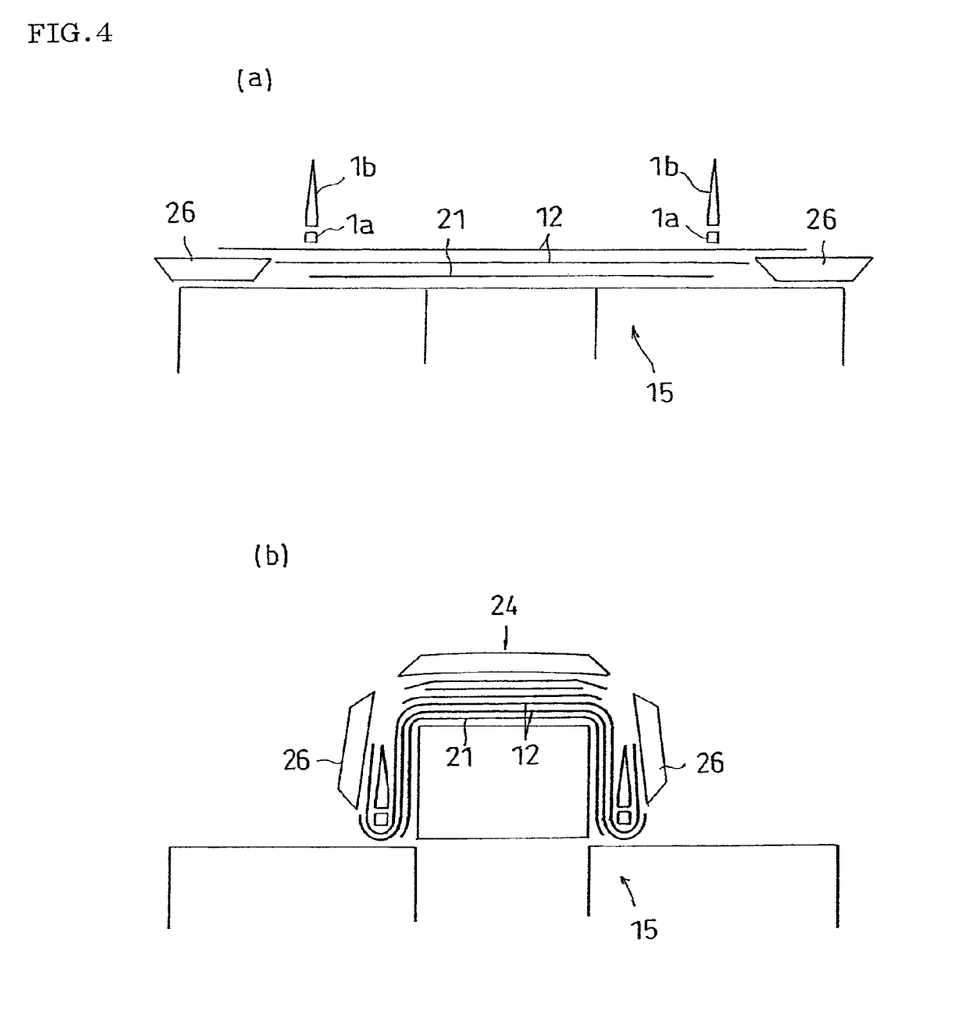
FIG. 4 shows schematic sectional views illustrating a producing method of a pneumatic tire of another embodiment of the invention.

Other Embodiments (1) FIG. 4 shows schematic sectional views illustrating a producing method of a pneumatic tire of another embodiment of the invention. A sidewall rubber member 26 used in this producing method is formed by once annually winding a rubber extrudate immediately after the rubber extrudate is extruded integrally. With this, the sidewall outer peripheral wall is not formed with the ribbon interface, and it is possible to effectively prevent cracks from being generated, the forming time is shortened, and the productivity is enhanced. It is possible to easily wind back the same together with the end of the carcass plies 12 in the widthwise direction.

(2) Although the carcass layer includes the two carcass plies in the above embodiment, the invention is not limited to this. Further, in this invention, when the sidewall rubber member disposed on the forming drum is in a high temperature state, there is a fear that the rubber member comes into close contact with the drum surface, and accordingly, it is preferable that the drum surface is subjected to shot blast to form fine projections and depressions.

EXAMPLES

To concretely show the structure and effect of the present invention, durability and productivity were evaluated. Concerning durability, a durability test was carried out in accordance with the method defined in JISD4230, and a relation between a running distance and a trouble was investigated. Concerning the productivity, a required time period for forming a green tire was measured, and an evaluation was done using indexes. Setting an index for a conventional example to 100, an index with a greater number indicates a greater productivity.

Example 1

Test tires (tire size: 205/40R17 80V, and tire cross section height: 79 mm) having the structure shown in FIG. 1 were produced as an example 1. In the forming procedure, a wide rubber ribbon having width of 40 mm, thickness of 2.0 mm (thickness of 1.2 mm at the end) was used, and the widthwise direction feeding amount S was 8.0 mm. As shown in the embodiment, the sidewall rubber member was wound back together with the end of the carcass ply in the widthwise direction.

Example 2

Test tires were produced as an example 2. The test tires of the example 2 are the same as those of the example 1 except that the sidewall rubber was constituted from a sidewall rubber member formed by once winding a rubber extrudate having width of 48 mm and thickness of 4.0 (thickness of 1.2 mm at the end) and that a rubber extrudate immediately after it was extruded was wound back at the same time as the end of the carcass ply in the widthwise direction.

Conventional Example

Test tires were produced as a conventional example. The test tires of the conventional example are the same as those of the example 1 except that the sidewall rubber was constituted from a sidewall rubber member formed by winding a narrow rubber ribbon (width of 15 mm and thickness of 1.5 mm) 16 times and that the sidewall rubber member has a narrow rubber ribbon wound around an outer periphery of a wound back ply on the forming drum. In the case of the conventional example, rigidity of the sidewall rubber member was low as compared with the examples of the invention, and the sidewall rubber member could not be wound back together with the end of the carcass ply in the widthwise direction.

Results of the evaluation are shown in Table 1.

TABLE 1

|  | Example 1 | Example 2 | Conventional example |
| --- | --- | --- | --- |
| Ribbon width (mm) | 40 | 48 | 15 |
| Ribbon thickness (mm) | 2.0 | 4.0 | 1.5 |
| The number of windings | 2 | 1 | 16 |
| Durability Running distance | 12000 km | 12000 km | 7000 km |
| Trouble | Absence | Absence | Crack in side |
| Productivity | 120 | 125 | 100 |

As shown in Table 1, in the conventional example, a crack was found in the sidewall outer peripheral wall when the running distance exceeded 7000 km. This crack was generated in the circumferential direction along the ribbon interface in a region of a maximum width position of the tire cross section from the shoulder portion. On the other hand, in each of the examples of the present invention, even when the running distance exceeded 12000 km, no crack was found. From the above results, it can be seen that the generation of crack is suppressed in the examples of the invention, and the examples have excellent durability as compared with the conventional example. Further, as compared with the conventional example in which a narrow rubber ribbon must be wound many times, each of the examples of the invention has excellent productivity.

What is claimed is:

1. A pneumatic tire comprising:
    a carcass layer for reinforcing a portion between a pair of annular beads; and
    a sidewall rubber which is disposed on an outside of the carcass layer in a widthwise direction of the tire and in which a rubber ribbon is spirally wound in plural turns along a circumferential direction of the tire so that each turn is deviated in a direction radially outward of the tire, wherein
    the rubber ribbon is a wide rubber ribbon having a width of 20 to 100 mm, and wound in a radially outward direction of the tire such that an inner end of the outermost turn of the spirally wound wide rubber ribbon disposed on the outermost side in the radial direction of the tire is located at a position toward an axis of the tire relative to the tire maximum width position and a cross section height h, which is a distance in the radial direction measured from a tread surface at the tire equator to the inner end of the outermost turn of the spirally wound wide rubber ribbon, is 55% or more with respect to an entire tire cross section height H, wherein shoulder portions connect tread portions to radially outer ends of sidewall portions and the tire maximum width position is located at the sidewall portions.

2. A producing method of a pneumatic tire, the method comprising:

spirally winding a wide rubber ribbon having a width of 20 to 100 mm in plural turns around an outer periphery of a forming drum along a circumferential direction, as feeding the wide rubber ribbon toward center from an outside edge in a widthwise direction of the drum, thereby a sidewall rubber member is formed at a location where an end of a carcass ply in the widthwise direction is disposed so that each turn is deviated radially outward in the final molded tire;

cylindrically disposing the carcass ply on the outer peripheral side of the forming drum;

fitting an annular bead over the carcass ply;

disposing a cylindrical second case on the outer peripheral side of the forming drum, said cylindrical second case comprising a tread rubber member;

winding back an end of the carcass ply in the widthwise direction around the annular bead to form a green tire, and vulcanizing the formed green tire in a mold to form the final molded tire, wherein in the winding back step, the end of the carcass ply in the widthwise direction is wound back together with the sidewall rubber member so that an inner end of the outermost turn of the spirally wound wide rubber ribbon disposed on the outermost side in the radial direction in the final molded tire is located at a position toward an axis of the tire relative to the tire maximum width position and a cross section height h, which is a distance in the radial direction measured from the tread surface at the tire equator to the inner end of the outermost turn of the spirally wound wide rubber ribbon, is 55% or more with respect to an entire tire cross section height H, and wherein, in the final molded tire, shoulder portions connect tread portions to radially outer ends of sidewall portions and the tire maximum width position is located at the sidewall portions.

3. The producing method of the pneumatic tire according to claim 2, wherein an entire tire cross section height H is not more than 110 mm.

4. The producing method of the pneumatic tire according to claim 2, wherein in the step for spirally winding a wide rubber ribbon, the number of turns of the wide rubber ribbon is not more than four times, and a relationship between a widthwise direction feeding amount per turn S (mm) of the wide rubber ribbon and a thickness T (mm) of the wide rubber ribbon satisfies one of:

(a) $0<S<2.0$, and $T\geq 0.8$,
(b) $2.0\leq S<4.0$, and $T\geq 1.0$,
(c) $4.0\leq S<6.0$, and $T\geq 1.2$, and
(d) $6.0\leq S\leq 8.0$, and $T\geq 1.5$.

5. A pneumatic tire having an entire tire cross section height H of 110 mm or less, comprising:

a pair of annular beads;

a carcass layer for reinforcing a portion between the pair of annular beads; and a sidewall rubber which is disposed on an outside of the carcass layer in a widthwise direction of the tire, said sidewall rubber comprising a wide rubber ribbon having a width of 20-100 mm, and the wide rubber ribbon is spirally wound in plural turns in a radially outward direction of the tire, along a circumferential direction of the tire so that each turn is deviated in a direction radially outward of the tire, wherein the wide rubber ribbon is wound in a radially outward direction of the tire and has an inner end of the outermost turn in a radial direction of the tire located at a position toward an axis of the tire relative to the tire maximum width position, and wherein a cross section height h, which is a distance in the radial direction measured from the tread surface at the tire equator to the inner end of the outermost turn of the spirally wound wide rubber ribbon, is 55% or more with respect to the entire tire cross section height H, wherein shoulder portions connect tread portions to radially outer ends of sidewall portions and the tire maximum width position is located at the sidewall portions.

6. The pneumatic tire according to claim 5, wherein the number of turns of the wide rubber ribbon is 2-4 turns and each turn is deviated radially outward of the tire.

7. A producing method of a pneumatic tire of claim 5, comprising:

spirally winding the wide rubber ribbon having a width of 20 to 100 mm in plural turns around an outer periphery of a forming drum along a circumferential direction toward center from the outside edge in a widthwise direction of the drum to form a sidewall rubber member;

cylindrically disposing the carcass ply on the outer peripheral side of the forming drum at a location where the wound rubber ribbon is disposed at an end of the carcass ply in the widthwise direction;

fitting the annular beads over the carcass ply; and outwardly bending at the bead the end of the carcass ply together with the sidewall rubber member in a direction nearly perpendicular to the widthwise direction to form a green tire, and vulcanizing the formed green tire in a mold to form the pneumatic tire.

8. The producing method according to claim 7, wherein in the step of forming the sidewall rubber member, the number of turns of the wide rubber ribbon is not more than four times, and a relationship between a widthwise direction feeding amount per turn S (mm) of the wide rubber ribbon and a thickness T (mm) of the wide rubber ribbon satisfies one of the following:

(a) $0<S<2.0$, and $T\geq 0.8$,
(b) $2.0\leq S<4.0$, and $T\geq 1.0$,
(c) $4.0\leq S<6.0$, and $T\geq 1.2$, and
(d) $6.0\leq S\leq 8.0$, and $T\geq 1.5$.

* * * * *

UNITED STATES PATENT AND TRADEMARK OFFICE
CERTIFICATE OF CORRECTION

PATENT NO. : 7,975,741 B2  
APPLICATION NO. : 11/379746  
DATED : July 12, 2011  
INVENTOR(S) : Kazuma Nishitani et al.

Page 1 of 1

It is certified that error appears in the above-identified patent and that said Letters Patent is hereby corrected as shown below:

In the drawings
At sheet 5 of 5 (FIG. 5), line 2, below Figure insert --Prior Art--.

In the Claims
At column 8, line 50, change "claimeed" to --claimed--.

Signed and Sealed this
Second Day of July, 2013

Teresa Stanek Rea
*Acting Director of the United States Patent and Trademark Office*